United States Patent
Cooper et al.

(10) Patent No.: US 9,590,856 B1
(45) Date of Patent: Mar. 7, 2017

(54) MULTICAST STREAM MAPPING

(75) Inventors: Michael A. Cooper, St. Peters, MO (US); Kerry Hu, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 1084 days.

(21) Appl. No.: 13/179,340

(22) Filed: Jul. 8, 2011

(51) Int. Cl.
G06F 3/048 (2013.01)
H04L 12/24 (2006.01)

(52) U.S. Cl.
CPC .............. *H04L 41/12* (2013.01); *G06F 3/048* (2013.01); *H04L 41/22* (2013.01)

(58) Field of Classification Search
CPC .......... H04L 41/12; H04L 41/22; G06F 3/048
USPC ......................................................... 715/736
See application file for complete search history.

(56) References Cited

U.S. PATENT DOCUMENTS

| | | | |
|---|---|---|---|
| 7,792,057 B2 | 9/2010 | Breslau et al. | |
| 2002/0057213 A1* | 5/2002 | Heath | 341/51 |
| 2002/0150094 A1* | 10/2002 | Cheng et al. | 370/389 |
| 2002/0188598 A1* | 12/2002 | Myllymaki | 707/2 |
| 2003/0135644 A1* | 7/2003 | Barrett | 709/238 |
| 2003/0235157 A1* | 12/2003 | Boivie et al. | 370/254 |
| 2005/0111349 A1* | 5/2005 | Vasseur et al. | 370/216 |
| 2007/0263544 A1* | 11/2007 | Yamanaka et al. | 370/238 |
| 2008/0101361 A1* | 5/2008 | Brown | H04L 45/16 370/390 |
| 2009/0319689 A1 | 12/2009 | Fernandez Gutierrez | |
| 2010/0046516 A1 | 2/2010 | Fernandez Gutierrez | |
| 2010/0050084 A1* | 2/2010 | Knapp et al. | 715/736 |
| 2012/0143830 A1* | 6/2012 | Cormode et al. | 707/687 |
| 2012/0179674 A1* | 7/2012 | Delling et al. | 707/736 |

* cited by examiner

*Primary Examiner* — William Bashore
*Assistant Examiner* — Gregory A Distefano
(74) *Attorney, Agent, or Firm* — Toler Law Group, PC

(57) ABSTRACT

Systems and methods for multicast stream mapping are disclosed. In one embodiment, a computer-based system to map multicast streams in a multicast network comprises a processor and a memory module coupled to the processor and comprising logic instructions stored on a tangible computer readable medium which, when execute by the processor, configure the processor to obtain a list of all access routers in the multicast network, create a process thread for each access router in the multicast network, collect multicast stream data from each access router in the multicast network, and present the multicast stream data in a report on a user interface. Other embodiments may be disclosed.

20 Claims, 7 Drawing Sheets

Query ipMRouteOctets (OID 1.3.6.1.2.1.83.1.1.2.1.10) to retrieve the Multicast Stream list flowing through access routers, then a.         Remove shared tree stream (source IP 0.0.0.0)
b.         Calculate valid multicast stream bandwidth usage $ /usr/bin/snmpwalk -v 2c -c xxxxx 10.xx.4.6 1.3.6.1.2.1.83.1.1.2.1.10

SNMPv2-SMI::mib-2.83.1.1.2.1.10.224.0.1.39.0.0.0.0.255.255.255.255 = Counter32: 0

SNMPv2-SMI::mib-2.83.1.1.2.1.10.224.0.1.xx.10.0.0.1.255.255.255.255 = Counter32: 0

SNMPv2-SMI::mib-2.83.1.1.2.1.10.224.0.1.xx.10.200.4.1.255.255.255.255 = Counter32: 0

SNMPv2-SMI::mib-2.83.1.1.2.1.10.224.0.1.40.0.0.0.0.255.255.255.255 = Counter32: 0

SNMPv2-SMI::mib-2.83.1.1.2.1.10.224.0.1.40.10.0.0.1.255.255.255.255 = Counter32: 0

SNMPv2-SMI::mib-2.83.1.1.2.1.10.224.2.127.254.0.0.0.0.255.255.255.255 = Counter32: 0

SNMPv2-SMI::mib-2.83.1.1.2.1.10.224.2.127.254.10.xx.72.20.255.255.255.255 = Counter32: 121188114

SNMPv2-SMI::mib-2.83.1.1.2.1.10.239.xx.6.1.0.0.0.0.255.255.255.255 = Counter32: 0

SNMPv2-SMI::mib-2.83.1.1.2.1.10.239.xx.6.1.10.xx.72.20.255.255.255.255 = Counter32: 2112326784

SNMPv2-SMI::mib-2.83.1.1.2.1.10.239.255.255.250.0.0.0.0.255.255.255.255 = Counter32: 0

SNMPv2-SMI::mib-2.83.1.1.2.1.10.239.255.255.250.10.xx.112.44.255.255.255.255 = Counter32: 1486

SNMPv2-SMI::mib-2.83.1.1.2.1.10.239.255.255.250.10.xx.112.45.255.255.255.255 = Counter32: 1486

SNMPv2-SMI::mib-2.83.1.1.2.1.10.239.255.255.250.10.xx.254.117.255.255.255.255 = Counter32: 6380

FIG. 4

Query pimRPState (OID 1.3.6.1.3.61.1.1.5.1.3), keep the stream RP (state = 1)

$ /usr/bin/snmpwalk -v 2c -c xxxxx 10.xx.4.6 1.3.6.1.3.61.1.1.5.1.3

SNMPv2-SMI::experimental.61.1.1.5.1.3.239.32.6.1.10.0.0.1 = INTEGER: 1

FIG. 5

Query ciscoIpMRoutePruneFlag (OID 1.3.6.1.4.1.9.10.2.1.1.2.1.12), keep the non-pruned stream (state = 1)

$ /usr/bin/snmpwalk -v 2c -c xxxxx 10.xx.4.6 1.3.6.1.4.1.9.10.2.1.1.2.1.12

SNMPv2-SMI::enterprises.9.10.2.1.1.2.1.12.224.0.1.39.0.0.0.0.255.255.255.255 = INTEGER: 2

SNMPv2-SMI::enterprises.9.10.2.1.1.2.1.12.224.0.1.39.10.0.0.1.255.255.255.255 = INTEGER: 1

SNMPv2-SMI::enterprises.9.10.2.1.1.2.1.12.224.0.1.39.10.200.4.1.255.255.255.255 = INTEGER: 1

SNMPv2-SMI::enterprises.9.10.2.1.1.2.1.12.224.0.1.40.0.0.0.0.255.255.255.255 = INTEGER: 2

SNMPv2-SMI::enterprises.9.10.2.1.1.2.1.12.224.0.1.40.10.0.0.1.255.255.255.255 = INTEGER: 1

SNMPv2-SMI::enterprises.9.10.2.1.1.2.1.12.224.2.127.254.0.0.0.0.255.255.255.255 = INTEGER: 2

SNMPv2-SMI::enterprises.9.10.2.1.1.2.1.12.224.2.127.254.10.32.72.20.255.255.255.255 = INTEGER: 2

FIG. 6

Query ciscoIpMRouteSptFlag (OID 1.3.6.1.4.1.9.10.2.1.1.2.1.18),
keep the stream with T flag (state = 1)

$ /usr/bin/snmpwalk -v 2c -c xxxxx 10.xx.4.6 1.3.6.1.4.1.9.10.2.1.1.2.1.18

SNMPv2-SMI::enterprises.9.10.2.1.1.2.1.18.224.0.1.39.0.0.0.0.255.255.255.255 = INTEGER: 2

SNMPv2-SMI::enterprises.9.10.2.1.1.2.1.18.224.0.1.39.10.0.0.1.255.255.255.255 = INTEGER: 1

SNMPv2-SMI::enterprises.9.10.2.1.1.2.1.18.224.0.1.39.10.200.4.1.255.255.255.255 = INTEGER: 1

SNMPv2-SMI::enterprises.9.10.2.1.1.2.1.18.224.0.1.40.0.0.0.0.255.255.255.255 = INTEGER: 2

SNMPv2-SMI::enterprises.9.10.2.1.1.2.1.18.224.0.1.40.10.0.0.1.255.255.255.255 = INTEGER: 1

SNMPv2-SMI::enterprises.9.10.2.1.1.2.1.18.224.2.127.254.0.0.0.0.255.255.255.255 = INTEGER: 2

SNMPv2-SMI::enterprises.9.10.2.1.1.2.1.18.224.2.127.254.10.32.72.20.255.255.255.255 = INTEGER: 1

SNMPv2-SMI::enterprises.9.10.2.1.1.2.1.18.239.32.6.1.0.0.0.0.255.255.255.255 = INTEGER: 2

SNMPv2-SMI::enterprises.9.10.2.1.1.2.1.18.239.32.6.1.10.32.72.20.255.255.255.255 = INTEGER: 1

SNMPv2-SMI::enterprises.9.10.2.1.1.2.1.18.239.255.255.250.0.0.0.0.255.255.255.255 = INTEGER: 2

SNMPv2-SMI::enterprises.9.10.2.1.1.2.1.18.239.255.255.250.10.32.112.44.255.255.255.255 = INTEGER: 1

FIG. 7

Query ciscoIpMRouteRegisterFlag (OID 1.3.6.1.4.1.9.10.2.1.1.2.1.16) to identify multicast source host (state = 1)

$ /usr/bin/snmpwalk -v 2c -c xxxxx 10.xx.4.6 1.3.6.1.4.1.9.10.2.1.1.2.1.16

SNMPv2-SMI::enterprises.9.10.2.1.1.2.1.16.224.0.1.39.0.0.0.0.255.255.255.255 = INTEGER: 2

SNMPv2-SMI::enterprises.9.10.2.1.1.2.1.16.224.0.1.39.10.0.0.1.255.255.255.255 = INTEGER: 2

SNMPv2-SMI::enterprises.9.10.2.1.1.2.1.16.224.0.1.39.10.200.4.1.255.255.255.255 = INTEGER: 2

SNMPv2-SMI::enterprises.9.10.2.1.1.2.1.16.224.0.1.40.0.0.0.0.255.255.255.255 = INTEGER: 2

SNMPv2-SMI::enterprises.9.10.2.1.1.2.1.16.224.0.1.40.10.0.0.1.255.255.255.255 = INTEGER: 2

SNMPv2-SMI::enterprises.9.10.2.1.1.2.1.16.224.2.127.254.0.0.0.0.255.255.255.255 = INTEGER: 2

SNMPv2-SMI::enterprises.9.10.2.1.1.2.1.16.224.2.127.254.10.32.72.20.255.255.255.255 = INTEGER: 2

SNMPv2-SMI::enterprises.9.10.2.1.1.2.1.16.239.32.6.1.0.0.0.0.255.255.255.255 = INTEGER: 1

SNMPv2-SMI::enterprises.9.10.2.1.1.2.1.16.239.32.6.1.10.32.72.20.255.255.255.255 = INTEGER: 1

SNMPv2-SMI::enterprises.9.10.2.1.1.2.1.16.239.255.255.250.0.0.0.0.255.255.255.255 = INTEGER: 2

FIG. 8

Query igmpCacheLastReporter (OID 1.3.6.1.2.1.85.1.2.1.4) to identify multicast destination hosts $ /usr/bin/snmpwalk -v 2c -c xxxxx 10.xx.4.6 1.3.6.1.2.1.85.1.2.1.4

SNMPv2-SMI::mib-2.85.1.2.1.4.224.0.1.39.1 = IpAddress: 10.xx.0.17

SNMPv2-SMI::mib-2.85.1.2.1.4.224.0.1.40.1 = IpAddress: 10.xx.0.18

SNMPv2-SMI::mib-2.85.1.2.1.4.239.32.6.1.37 = IpAddress: 10.xx.72.204

SNMPv2-SMI::mib-2.85.1.2.1.4.239.255.255.250.37 = IpAddress: 10.xx.72.203

MULTICAST STREAM MAPPING

BACKGROUND

Multicast networks transmit data from a source node to a group of receivers in a single transmission, and are frequently referred to as a one-to-many, or a many-to-many networking environment. Network nodes, e.g., switches and/or routers, manage the process of replicating the data and forwarding the data to users in a network-efficient manner.

Source nodes and receiver nodes use a multicast group address to send and receive multicast messages. Source nodes use the group address as the IP destination address in their data packets. Receivers use the address to inform the network that they are interested in receiving packets sent to that group.

Any Source multicast networks are based on the concept of two types of multicast distribution trees. When a receiver joins a multicast group, or a source sends multicast data, a multicast distribution tree is constructed for that group. Multicast distribution trees are constructed so that data packets from senders to a multicast group reach all receivers which have joined the group.

Troubleshooting a multicast network may benefit from a mapping of multicast streams in a multicast network. Accordingly, systems and methods to generate a mapping of multicast streams may find utility.

SUMMARY

Embodiments of systems and methods in accordance with the present disclosure may provide multicast stream mapping. In one embodiment, a computer-implemented method to map multicast streams in a multicast network comprises obtaining a list of all access routers in the multicast network, creating a process thread for each access router in the multicast network, collecting multicast stream data from each access router in the multicast network and presenting the multicast stream data in a report on a user interface.

In another embodiment, a computer based system to map multicast streams in a multicast network comprises a processor and a memory module coupled to the processor and comprising logic instructions stored on a tangible computer readable medium, which, when executed by the processor, configure the processor to obtain a list of all access routers in the multicast network, create a process thread for each access router in the multicast network, collect multicast stream data from each access router in the multicast network, and present the multicast stream data in a report on a user interface.

In a further embodiment, a computer program product comprises logic instructions stored on a tangible computer readable medium which, when executed by the processor, configure the processor to implement a method to map multicast streams in a multicast network by performing operations comprising obtaining a list of all access routers in the multicast network, creating a process thread for each access router in the multicast network, collecting multicast stream data from each access router in the multicast network and presenting the multicast stream data in a report on a user interface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

FIGS. 4-9 are schematic illustrations of multicast stream identifiers, according to embodiments.

DETAILED DESCRIPTION

Systems, methods, and computer program products to map multicast streams in a multicast network are described herein. Specific details of certain embodiments are set forth in the following description and in the Figures to provide a thorough understanding of such embodiments. One skilled in the art will understand, however, that alternate embodiments may be practiced without several of the details described in the following description.

Figure 1:
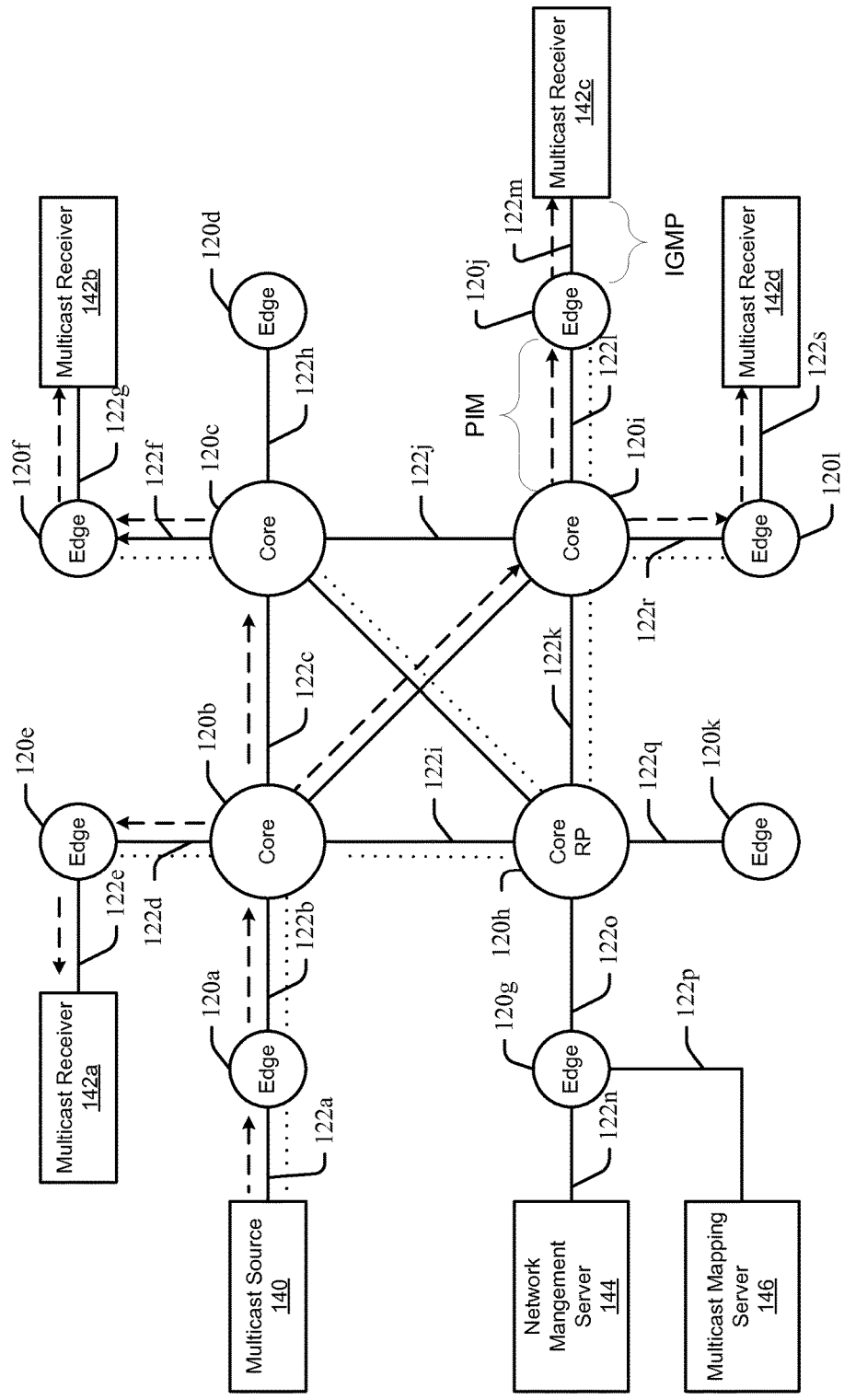
FIG. 1 is a schematic illustration of a multicast network, according to embodiments.

FIG. 1 is a schematic illustration of a multicast network, according to embodiments. In the embodiment depicted in FIG. 1, the network 100 comprises at least one multicast source node 140 coupled to a plurality of multicast receivers 142a, 142b, 142c, 142d, which may be referred to collectively or individually by the reference numeral 142. Each of the multicast source node 140 and the multicast receiver nodes 142 may be embodied as computer-based devices. By way of example, multicast source 140 may be embodied as a computer server. Similarly, multicast receiver nodes 142 may be embodied as computer servers or as personal computers, mobile devices, or the like.

Multicast network 100 further comprises a plurality of network nodes 120a, 120b, 120c, 102d, 120e, 120f, 120g, 120h, 120i, 120j, 120k, 120l, which may be referred to collectively or individually by reference numeral 120. The network nodes 120 may be embodied as switching devices, e.g., switches or routers or the like that implement a multicasting protocol such as the Protocol Independent Multicast (PIM) family of multicast routing protocols for Internet Protocol (IP) network. PIM provides one-to-many and many-to-many distribution of data over a LAN, WAN, or the Internet.

The network nodes 120 are connected by communication links 122a, 122b, 122c, 122d, 122e, 122f, 122g, 122h, 122i, 122j, 122k, 122l, 122m, 122n, 122o, 122p, 122q, 122r, which may be referred to collectively or individually by the reference numeral 122. The communication links 122 may be embodied as wired links or as wireless links. The particular communication medium used to establish the communication links 122 is not critical.

Some of the network nodes 120 may be considered core routers, while other network nodes 120 may be considered edge routers. In the embodiment depicted in FIG. 1 the core routers are represented by reference numerals 120b, 120c, 120h, 120i, while the edge routers are represented by reference numerals 120a, 120e, 120f, 120g, 120j, 120k, 120l. In addition, router 120h is the rendezvous point router.

A network management server 144 may be communicatively coupled to the network 100. In some embodiments network management server 144 collects data from the source node(s) 140 and receiver nodes 142 coupled to the network and from the various network nodes 120 in the network. The network management server 144 may process and manipulate data from the various network devices to manage network operations.

While the communication network depicted in FIG. 1 is illustrated as a grid network, the particular configuration of the network 100 is not critical. The communication network 100 may be implemented in a grid, in one or more rings, or in a linear network. Similarly, the particular operating protocol(s) of the communication network 100 is not critical.

In some embodiments mapping operations may be implemented by a multicast mapping server 146 coupled to the network 100. FIG. 4 is a schematic illustration of a computing device which may be adapted to implement an multicast mapping server 146 in accordance with some embodiments. In one embodiment, system 200 includes a computing device 208 and one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing device 208 includes system hardware 220 and memory 230, which may be implemented as random access memory and/or read-only memory. A file store 280 may be communicatively coupled to computing device 208. File store 280 may be internal to computing device 108 such as, e.g., one or more hard drives, CD-ROM drives, DVD-ROM drives, or other types of storage devices. File store 180 may also be external to computer 208 such as, e.g., one or more external hard drives, network attached storage, or a separate storage network.

System hardware 220 may include one or more processors 222, a graphics processor(s) 224, network interfaces 226, and bus structure(s) 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processors that manage graphics and/or video operations. Graphics processor(s) 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 230 may include an operating system 240 for managing operations of computing device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 130. Operating system 240 may be embodied as a Windows® brand operating system or as a UNIX operating system or any derivative thereof (e.g., Linux, Solaris, etc.), or other operating systems including real time operating systems such as QNX.

In one embodiment memory 230 includes a multicast mapping module 260 to generate a map of multicast streams in the multicast network 100. Multicast mapping module 260 may include logic instructions encoded in a tangible computer-readable medium which, when executed by processor 222 cause the processor 222 to perform the operations depicted in FIG. 3 and to map multicast streams in the network 100.

Figure 3:
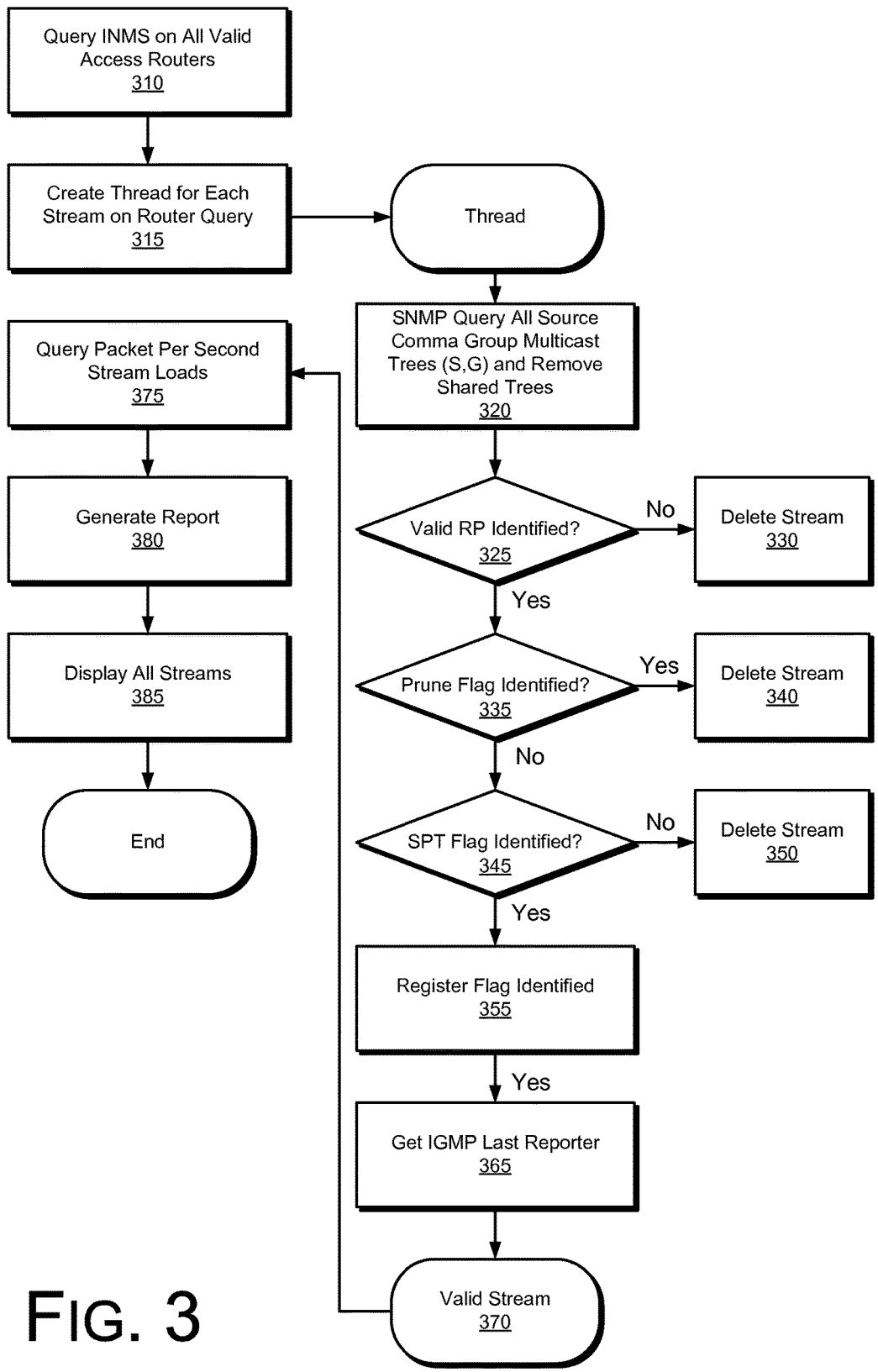
FIG. 3 is a flowchart illustrating operations in methods to map multicast streams, according to embodiments.

FIG. 3 is a flowchart illustrating operations in methods to map multicast streams, according to embodiments, and FIGS. 4-9 are schematic illustrations of multicast stream identifiers, according to embodiments. Operations of the mapping module will be explained with reference to FIGS. 3-9.

By way of overview, the method described herein creates an output of valid end to end multicast streams (i.e., valid multicast stream bandwidth usage) on an Any Source Multicast (ASM) network in which traffic is forwarded along the Shortest Path Tree (SPT). Multicast networks commonly generated are two types of multicast distribution trees, shared and shortest path trees, also known as source tree and commonly referred to as source comma group (S,G). The shared tree, commonly referred to as start comma group (*,G) is built first and centered on the root node called the Rendezvous Point (RP). In the embodiment depicted in FIG. 1 the shortest path tree (SPT) is indicated by the dashed arrows adjacent to the communication links, while the shared tree is indicated by the dotted lines adjacent to the communication links.

Multicast traffic initially uses the shared tree. During operation of the network the last hop router closest to the receiver will initiate the building of the shortest path tree back to the source to create the most direct path between source and receiver. Once created, the multicast stream will switch from using the shared tree (through the RP) to the shortest path tree to route the traffic. In some networks the shared tree and the shortest path tree may be identical in their path, but traffic will still use the shortest path tree. Multicast uses the Protocol Independent Multicast (PIM) protocol between all routers on a network. Internet Group Management Protocol (IGMP) is used between receivers and their first hop routers.

Referring first to FIG. 3, at operation 310 the multicast mapping module 260 queries the network management server 144 to obtain a list of all access routers in the network 100. In some embodiments the server 144 issues an SNMP query to specified Management Information Bases (MiB's) on all edge routers on the network 100. By way of example, the server 144 queries ipMRouteOctets (OID 1.3.6.1.2.1.83.1.1.2.1.10) to retrieve the Multicast Steam list flowing through access routers.

At operation 315 a process thread is created for each stream on the router query. Operations 320-370 are performed for each thread generated in operation 315.

At operation 320 the multicast mapping module 260 queries all Source Comma group multicast trees (S,G). Each thread created in both the shared tree and the shortest path tree entries in the multicast routing table. Because traffic is forwarded, and the disclosed method uses the shortest path tree and all shared tree entries are eliminated. Shared trees (*,G) are source irrelevant and mean any source. To eliminate the shared trees, all entries where the source address is 0.0.0.0 are removed. These entries are illustrated in FIG. 4. Remaining shortest path tree multicast route entries which display a source address are kept and sent to the next step for RP validation. In some embodiments the stream load counters are calculated and used later to finalize the size of the stream.

At operation 325 it is determined whether a valid rendezvous point (RP) is identified in the entries returned by the SNMP query. In some embodiments this may be obtained by performing a query on the MiB pimRPState (OID 1.3.6.1.3.61.1.1.5.1.3) and keeping streams for which RP (state=1), as illustrated in FIG. 5. Multicast networks normally will scope the multicast group address range per their own policy. This limits the actual multicast group addresses available for users of the network. There are various technical and internal policy reasons to do this. One reason is there are many multicast groups that are designated for use by various protocols, technologies or vendor-specific use. One policy reason is that organizations will have designated ranges for certain areas and have the need to restrict certain ranges for use in a single PIM domain. Scoping multicast group ranges is done by filtering groups for which the Rendezvous Point (RP) will allow. Each shortest path tree is queried for an RP. If no RP is listed then control passes to operation 325 and the stream is deleted. By contrast, if a RP is listed then the shortest path tree is kept and control passes to operation 335.

At operation 335 it is determined whether the prune flag (P flag) is identified. In some embodiments this may be obtained by performing a query on the MIB ciscoIpM-RoutePruneFlag (OID 1.3.6.1.4.1.9.10.2.1.1.2.1.12), and keeping the non-pruned stream (state=1), as illustrated in FIG. 6. A prune flag indicates that the outgoing interface for the stream is Null, meaning the stream is not being forwarded. There can be many different reasons why the prune flag is displayed, but the method's purpose is to only display valid streams (e.g., valid multicast stream bandwidth usage). If a prune flag is identified (e.g., prune flag set) then control passes to operation 340 and the stream is deleted. By contrast, no prune flag is identified then the shortest path tree is kept and control passes to operation 345.

At operation 345 it is determined whether a shortest path tree (T) flag is identified. In some embodiments this may be obtained by performing a query on the MIB Query ciscoIp-MRouteSptFlag (OID 1.3.6.1.4.1.9.10.2.1.1.2.1.18), and keeping the stream(s) with T flag (state=1), as illustrated in FIG. 7. An SPT Flag appears on a shortest path tree entry when traffic is being forwarded along that tree. If a T flag is not identified then control passes to operation 350 and the stream is deleted. By contrast, a T flag is identified then the shortest path tree is kept and control passes to operation 355.

At operation 355 a register (F) flag is identified. In some embodiments this may be obtained by performing a query on the MIB ciscoIpMRouteRegisterFlag (OID 1.3.6.1.4.1.9.10.2.1.1.2.1.16) to identify multicast source host (state=1), as illustrated in FIG. 8. A Register Flag (F Flag) is set on a shortest path tree entry (e.g., shortest path tree flag is set) for the router where the source of the stream is connected. The Register flag is listed only on the source router shortest path tree entry. This same entry on all other routers will not have a Register flag. This step provides a source address of the multicast stream along with the source router for that particular stream.

At operation 365 the IGMP Last Reporter (IGMP) function is queried to obtain a list of a last multicast stream receiver to ask for that stream. IGMP may be used by a system to signal its upstream router that is wishes to receive a specific multicast group stream. This function will show all active groups and a single receiving host on a subnet for that group. This output is used to display last host per subnet on that router to ask for the stream. This provides the end users receiving. Also if any IGMP query returned hosts, the router is designated as a receiving router. An example of the output of the IGMP query is illustrated in FIG. 9.

Figure 2:
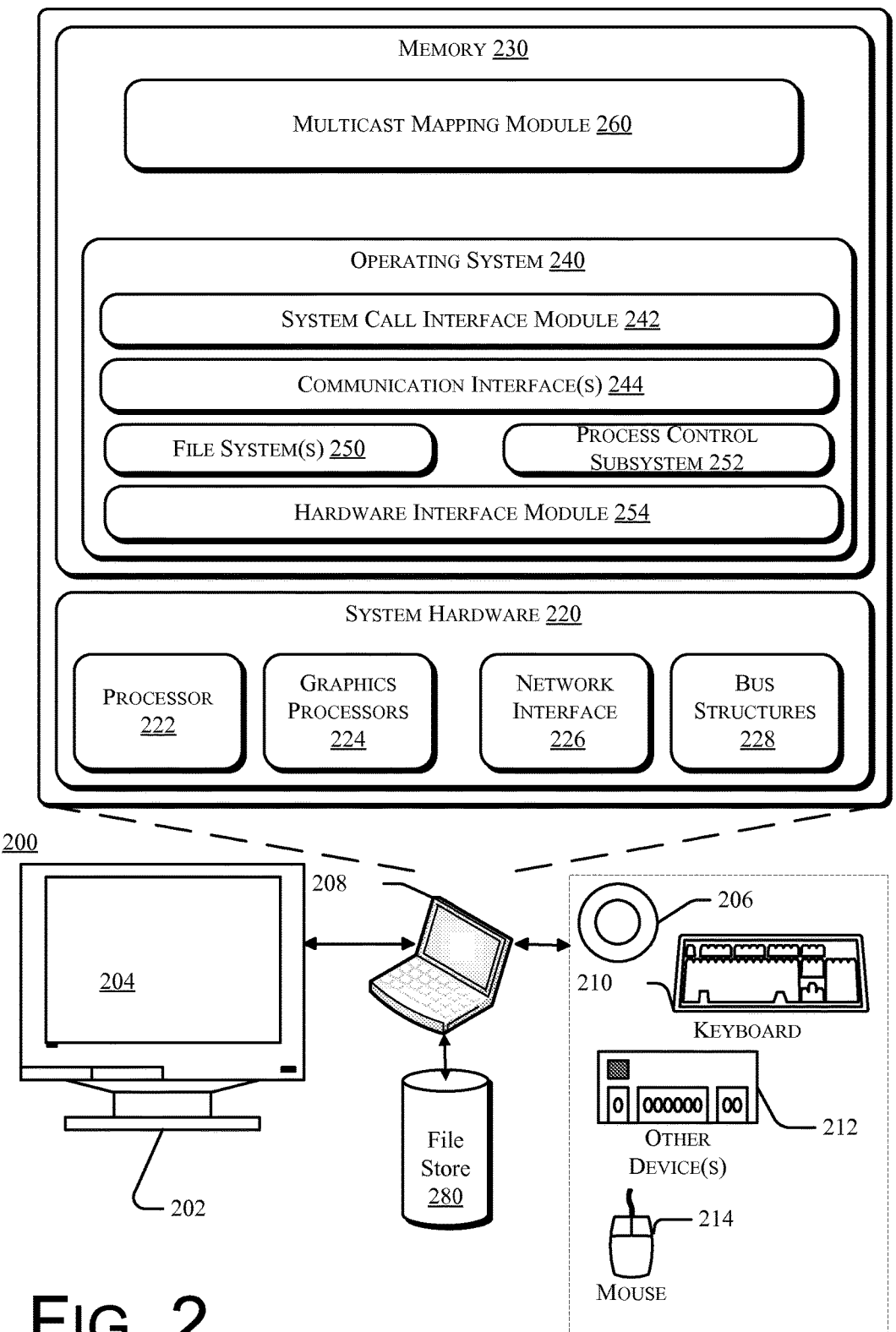
FIG. 2 is a schematic illustration of a computer-based system to map multicast streams, according to embodiments.

Once operations 320-370 are completed control passes back to operation 375, where the packet/second stream loads are queried for the multicast streams that were not deleted. At operation 380 a report is generated, which is output to a display such as the display 204 depicted in FIG. 2. In some embodiments the report may be formatted using XML/HTML formatting such that the report may be presented in a web browser. In other embodiments the report may be stored in suitable storage medium.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method comprising:
   obtaining a router list of edge routers in a multicast network;
   receiving a stream list of multicast streams flowing through the edge routers;
   in response to determining that a rendezvous point associated with a particular stream is valid, determining, based on a first query response that corresponds to the particular stream, whether a prune flag is set for the particular stream;
   in response to determining that the prune flag is not set, determining, based on a second query response that corresponds to the particular stream, whether a shortest path tree flag is set for the particular stream, wherein the second query response corresponds to a second query of a management information base (MIB) database, and wherein the shortest path tree flag being set indicates that the particular stream is valid; and
   in response to determining that the shortest path tree flag is set, generating an output indicating that the particular stream is valid.

2. The method of claim 1, further comprising:
   determining a source address of the particular stream of the multicast streams based on a third query response that corresponds to the particular stream; and
   determining whether to delete the particular stream from the stream list based on the source address, wherein the third query response corresponds to a third query of the MIB database.

3. The method of claim 1, further comprising:
   in response to a source address not being a particular address, determining the rendezvous point for the particular stream based on a third query response that corresponds to the particular stream; and
   determining whether to delete the particular stream from the stream list based on a validity of the rendezvous point,
   wherein the second query is sent in response to the rendezvous point being valid.

4. The method of claim 3, further comprising:
   determining whether to delete the particular stream from the stream list in response to the prune flag being set,
   wherein the second query is sent in response to the prune flag not being set.

5. The method of claim 1, further comprising:
   determining, based on a third query response that corresponds to a second particular stream, whether a second shortest path tree flag is set for the second particular stream; and
   deleting the second particular stream from the stream list in response to the second shortest path tree flag not being set.

6. The method of claim 1, further comprising calculating a valid multicast stream bandwidth usage for the particular stream.

7. The method of claim 1, further comprising:
   sending a third query to an internet group management networking protocol (IGMP) function; and
   in response to sending the third query, receiving a list of multicast stream receivers.

8. The method of claim 1, wherein the first query response corresponds to a first query of the MIB database, wherein a first value of the prune flag indicates that the particular stream is invalid.

9. A system comprising:
   a processor;
   a memory module coupled to the processor and comprising logic instructions stored on a tangible computer readable medium which, when executed by the processor, cause the processor to:
      obtain a router list of edge routers in a multicast network;
      receive a stream list of multicast streams flowing through the edge routers;
      in response to a determination that a rendezvous point associated with a particular stream is valid, determine, based on a first query response that corresponds to the particular stream, whether a prune flag is set for the particular stream;
      in response to a determination that the prune flag is not set, determine, based on a second query response that corresponds to the particular stream, whether a shortest path tree flag is set for the particular stream, wherein the second query response corresponds to a second query of a management information base (MIB) database, and wherein the shortest path tree flag being set indicates that the particular stream is valid; and
      in response to a determination that the shortest path tree flag is set, generate an output indicating that the particular stream is valid.

10. The system of claim 9, wherein the instructions further cause the processor to: to delete the particular stream in response the shortest path tree flag not being set.

11. The system of claim 9, wherein the instructions further cause the processor to:
    in response to a source address not being the particular address, determine the rendezvous point for the particular stream based on a third query response that corresponds to the particular stream; and
    determine whether to delete the particular stream from the stream list based on a validity of the rendezvous point,
    wherein the second query is sent in response to the rendezvous point being valid.

12. The system of claim 11, wherein the instructions further cause the processor to:
    determine whether to delete the particular stream from the stream list in response to the prune flag being set,
    wherein the second query is sent in response to the prune flag not being set.

13. The system of claim 9, wherein the instructions further cause the processor to:
    determine, based on a third query response that corresponds to a second particular stream, whether a second shortest path tree flag is set for the second particular stream; and
    delete the second particular stream from the stream list in response to the second shortest path tree flag not being set.

14. The system of claim 9, wherein the instructions are further configured to cause the processor to calculate a valid multicast stream bandwidth usage for the particular stream.

15. The system of claim 9, wherein the prune flag being set corresponds to the prune flag having a first value, wherein the prune flag not being set corresponds to the prune flag having a second value distinct from the first value, and wherein the shortest path tree flag being set corresponds to the shortest path tree flag having a third value.

16. A computer program product comprising instructions stored on a non-transitory computer readable medium which, when executed by a processor, cause the processor to perform operations comprising:
  obtaining a router list of edge routers in a multicast network;
  receiving a stream list of multicast streams flowing through the edge routers;
  determining a source address of a particular stream of the multicast streams from a first query response that corresponds to the particular stream;
  deleting the particular stream from the stream list if the source address is a particular address;
  if the source address is not the particular address, determining a rendezvous point for the particular stream from a second query response that corresponds to the particular stream;
  deleting the particular stream from the stream list if the rendezvous point is invalid is invalid;
  if the rendezvous point is valid, determining from a third query response that corresponds to the particular stream, whether a prune flag is set for the particular stream;
  deleting the particular stream from the stream list if the prune flag is set;
  if the prune flag is not set, determining, from a fourth query response that corresponds to a particular stream, whether a shortest path tree flag is set for the particular stream;
  deleting the particular stream from the stream list if the shortest path tree flag is not set; and
  generating an output indicating that the particular stream is valid if the particular stream is not deleted from the stream list after determining whether the shortest path tree flag is set.

17. The computer program product of claim 16, wherein the operations further comprise calculating a valid multicast stream bandwidth usage for the particular stream.

18. The computer program product of claim 16, wherein the output comprises a report in a format capable of being presented in a web browser.

19. The computer program product of claim 16, wherein the particular address is 0.0.0.0.

20. The computer program product of claim 16, wherein the operations further comprise:
  determining, from a fifth query response that corresponds to a second particular stream, whether a second shortest path tree flag is set for the second particular stream; and
  deleting the second particular stream from the stream list when the second shortest path tree flag is not set.

* * * * *